(No Model.) 3 Sheets—Sheet 1.

W. STANLEY, Jr.
ELECTRIC METER.

No. 366,268. Patented July 12, 1887.

Witnesses
Charles A. Terry
Romena C. Jones

Inventor
William Stanley Jr.
By Attorneys
Pope & Edgecomb (No Model.) 3 Sheets—Sheet 3.

W. STANLEY, Jr.
ELECTRIC METER.

No. 366,268. Patented July 12, 1887.

United States Patent Office.

WILLIAM STANLEY, JR., OF GREAT BARRINGTON, MASSACHUSETTS, ASSIGNOR TO GEORGE WESTINGHOUSE, JR., OF PITTSBURG, PENNSYLVANIA.

ELECTRIC METER.

SPECIFICATION forming part of Letters Patent No. 366,268, dated July 12, 1887.

Application filed August 22, 1885. Renewed September 4, 1886. Serial No. 212,752. (No model.)

*To all whom it may concern:*

Be it known that I, WILLIAM STANLEY, Jr., a citizen of the United States, residing in Great Barrington, in the county of Berkshire and State of Massachusetts, have invented certain new and useful Improvements in Electric Meters, of which the following is a specification.

My invention relates to the class of apparatus employed for registering the amount of electric energy delivered upon a circuit.

The object of the invention is to provide simple and efficient means for determining the number of coulombs conveyed—that is to say, the sum of the ampères delivered in any time, whether the potential be constant or not, or, if it is desired, the number of watts.

The principle of the invention consists in occasioning a movement of an indicating-register at a rate depending upon the attractive force exerted between coils of wire traversed by the current to be measured. It is intended that any current traversing these coils shall turn a scale-beam upon its axis and, through suitable mechanism, impart a movement to the registering device, the rate of which is dependent upon the degree of movement of the scale-beam. The attractive force is exerted through the instrumentality of an electro-dynamometer, the high-resistance coil of which is included in the circuit leading from the points of greatest difference of potential, while the low-resistance coil is included in the main circuit. An increase of attraction causes the beam from which it is suspended to incline, and thus bring a perimeter-wheel in contact with a constantly-revolving disk. The motion which this wheel receives gradually moves a second perimeter-wheel from its position of rest at the center of the disk in a radial direction. The distance which it is thus moved is dependent upon the force exerted by the dynamometer, which is counterbalanced by the weight of the carriage of the second wheel moving along the scale-beam. So long as the current remains constant the second perimeter-wheel will remain in a given radial position, and will thus receive a constant rate of revolution; but an increase or decrease will cause a proportionate movement away from or toward the center of the disk. The revolutions of this second perimeter-wheel are registered by means of an indicating or recording train in any convenient manner.

Figure 1:
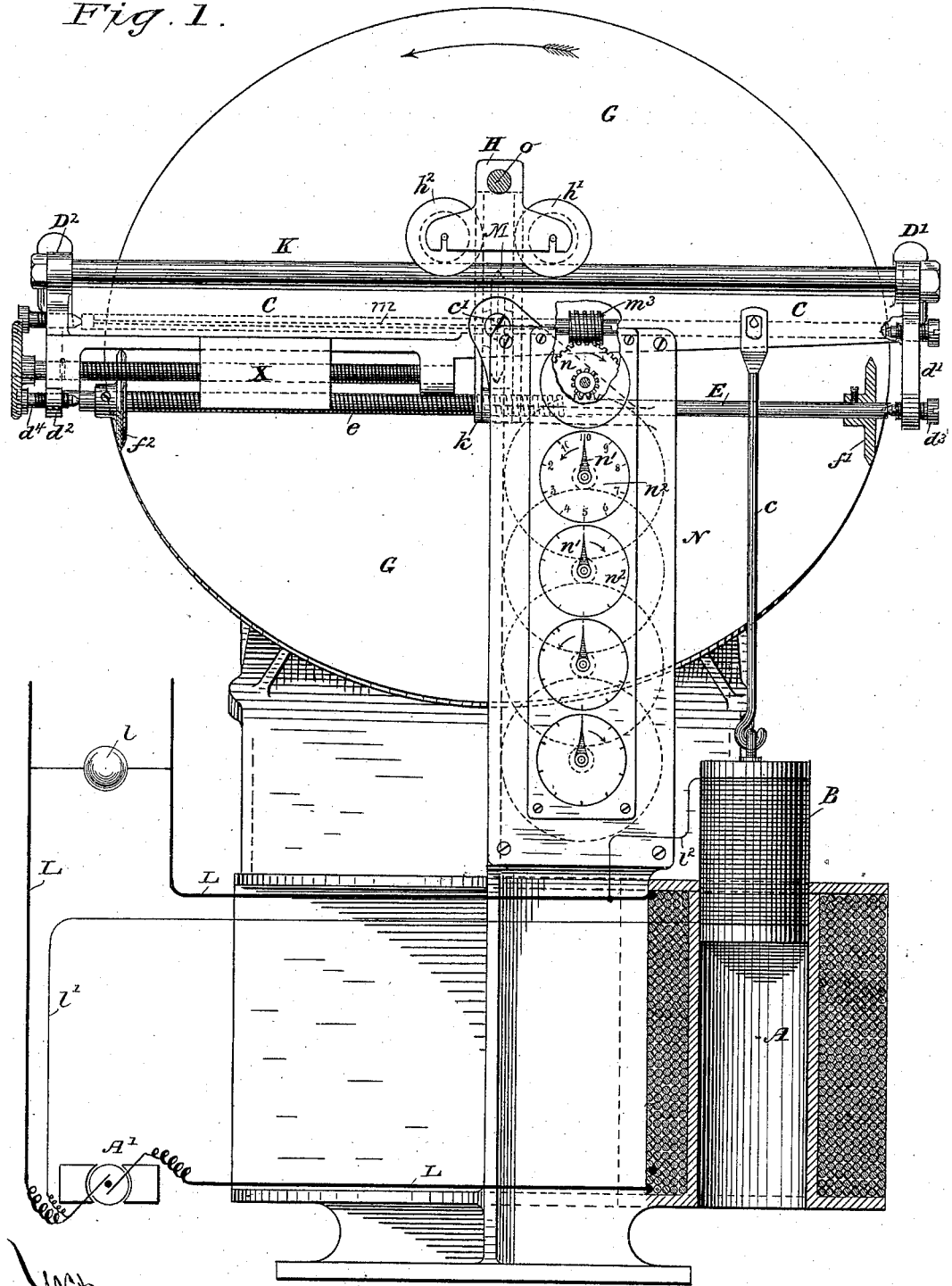
Figure 2:
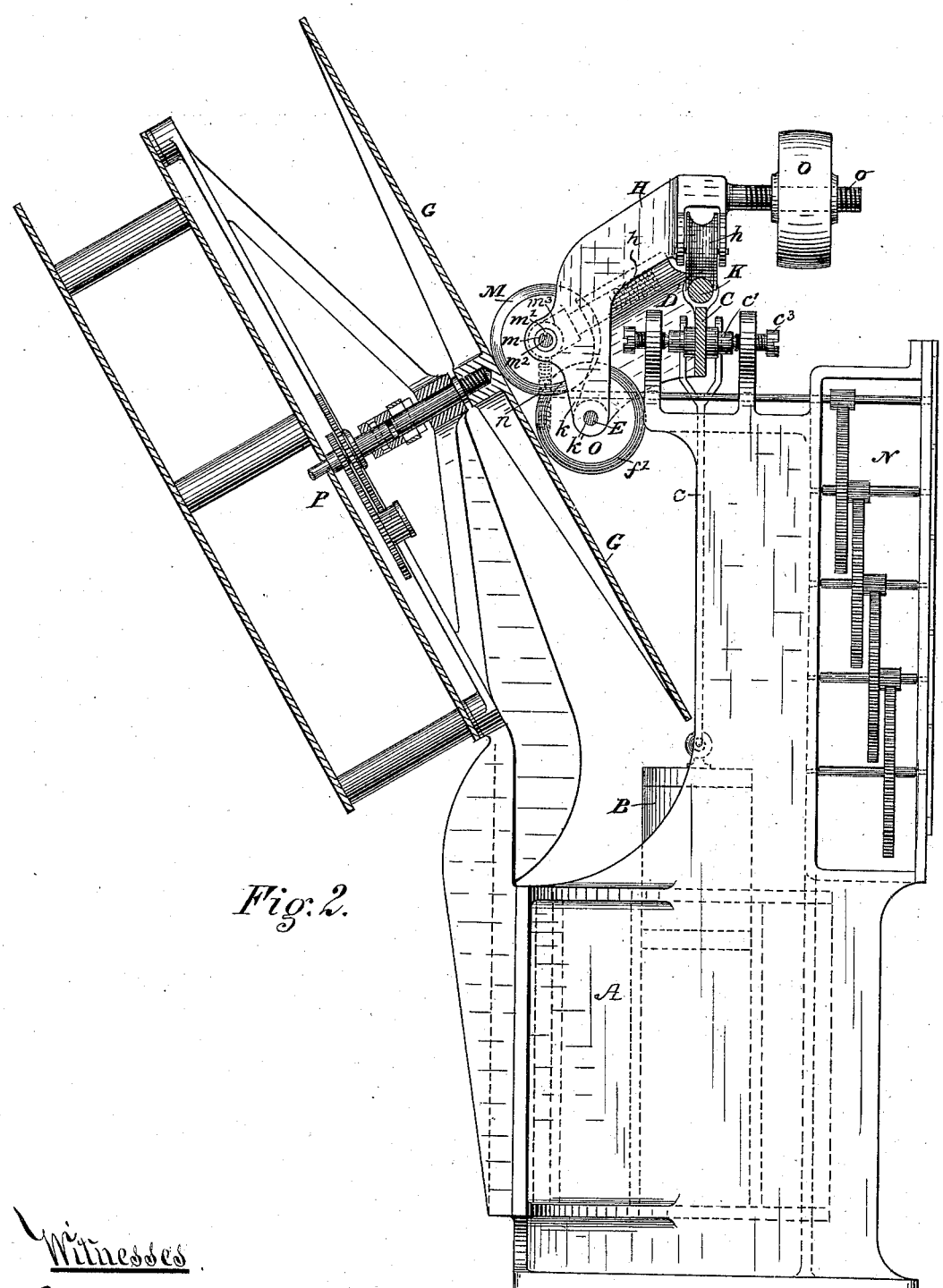
Figure 3:
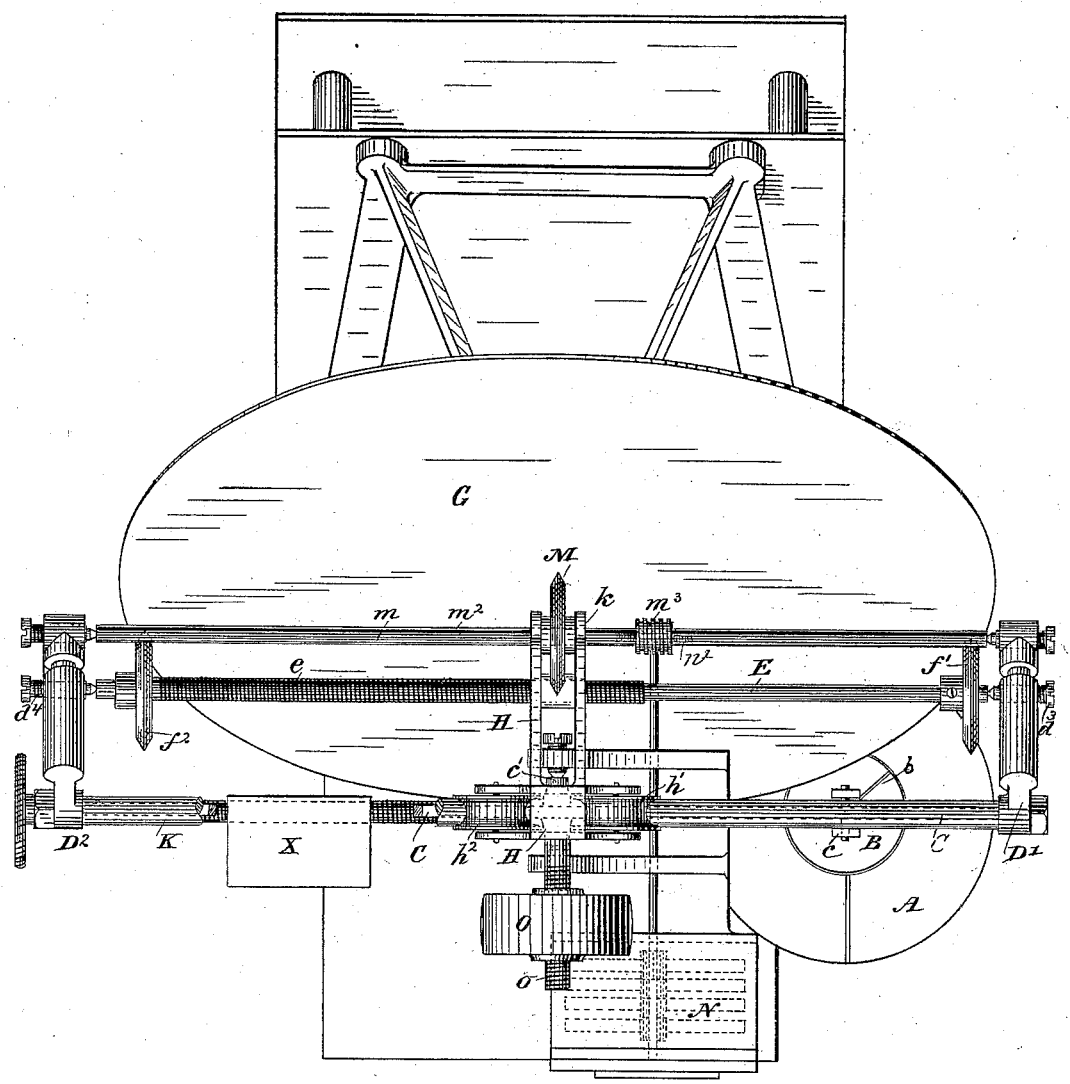

In the accompanying drawings, Figure 1 is a front elevation, partly in section, of an instrument embodying the features of the invention; and Fig. 2 is a side elevation of the same, also partly in section. Fig. 3 is a plan view.

Referring to the figures, A represents a low-resistance coil of insulated wire, which is designed to be included in a main circuit, the current passing through which it is desired to measure. Within this coil, near its upper end, is suspended a high-resistance coil of wire, B, this coil being constructed of fine wire closely wound upon a suitable non-magnetic spool. The spool is preferably of brass, and is slotted longitudinally, as shown at $b$, to prevent Foucault currents. The spool upon which the coil A is wound is also preferably slotted similarly.

A generator is represented at A'. One pole is connected with the main line L and the other through the coil A with the main line L. A conductor, $l'$, leads from the first-named pole of the generator A' to the coil B, and a conductor, $l^2$, leading from this coil is connected with the conductor leading from the coil A. The translating devices may be included between the two arms of the main line, as shown at $l$. The coil B is suspended by a rod, $c$, from a scale-beam, C. This beam is delicately poised by means of a trunnion, $c'$. A counter-balance, $x$, is placed upon one arm of the scale-beam for the purpose of balancing the coil B and the rod $c$. Upon one end of the beam C there is carried an arm, D', and a similar arm, D², is carried upon the opposite end. The arms D' and D² are provided with extensions $d'$ and $d^2$, carrying small screws $d^3$ and $d^4$, between which there is pivoted a worm-shaft, E. This is provided with a screw-thread, $e$, throughout a portion of its length, as indicated. Two perimeter-wheels, $f'$ and $f^2$, are carried near the respective ends of the shaft E, and they are so placed that when the beam C is balanced neither wheel will touch an inclined disk, G, which is designed to be revolved at a constant rate by means of a suitable train of clock-work in the direction indicated by the arrow. When, however, either side of the beam is depressed, the corresponding perimeter-wheel rests upon the surface of the revolving disk G and receives therefrom a revolution of its own, carrying with it the shaft E. The disk G is driven at a constant speed by a suitable train, P, or, if it is desired, by an electric motor. The revolutions of the shaft E are designed to move a carriage, H, along a track-bar, K, which is supported between the arms D' and D². Upon this bar there rest two grooved wheels, $h'$ and $h^2$, which support the carriage H. An extension, $k$, of the carriage is constructed to encircle the shaft E, and it is provided with an inner screw-thread, $k'$, which engages with the thread $e$ upon the shaft. The revolution, therefore, of the shaft serves to drive the carriage H along the bar K in one direction or the other, according to the direction in which the shaft E is revolved—that is to say, according as the wheel $f'$ or $f^2$ touches the disk G. If, therefore, the wheel $f'$ be caused to press against the disk, the carriage H will be moved to the left hand, and if, on the contrary, the wheel $f^2$ touches the disk, the carriage will move toward the right hand.

In the carriage H is carried a perimeter-wheel, M, which is movable along a rod, $m$, to which it is coupled by a spline, $m'$, and groove $m^2$. The wheel M is pressed against the disk G by a spring, $h$, so that it will be held in contact therewith during the rise and fall of the scale-beam C. It is designed to be driven at a speed dependent upon the position of the coil B relative to the coil A. For this purpose the wheel M normally stands at the center of the disk G, and is therefore at rest. When, however, the coil B is drawn downward and the wheel $f'$ causes the carriage H to move toward the left hand, then will the perimeter-wheel M be carried to one side, and by pressing against the disk at a point away from the center it will be driven in the direction of the arrow, Fig. 2, at a speed dependent upon the distance which the carriage H has been moved. It will be observed, however, that as the carriage moves toward the left hand the pull exerted by the coil B will be counteracted by the weight of the carriage, so that at a certain point the two will exactly balance each other and the wheel $f'$ will be lifted from the disk G. The perimeter-wheel M, however, will stand at this point until the coil B is permitted to rise by reason of a decrease in the current, and therefore the wheel M will continue to revolve at a given rate of speed. Upon a decrease of the current the wheel $f^2$ will touch the disk G by reason of the weight of the carriage, and therefore the carriage H will be driven in the opposite direction—that is, toward the center. In this manner it will be seen that the position of the wheel M, and therefore its rate of revolution, will be always dependent upon the current traversing the coils A and B.

For the purpose of registering the revolutions of the wheel M, there is attached to the shaft $m$, upon which the wheel is carried, a worm, $m^3$. This worm engages the teeth of a wheel, $n$, of an indicating-train, N. The train N is constructed with any desired number of wheels gearing with each other and constructed with indices $n'$ and dials $n^2$. These serve to register the revolutions of the shaft $m$ and those of the wheel M in a manner well understood.

For the purpose of adjusting the pressure of the wheel M, a counterpoise, O, is preferably placed upon an arm, $o$, extending from the carriage upon the opposite side of the carriage-rod.

It is evident that various modifications in the construction of the apparatus may be devised without departing from the spirit of the invention.

I claim as my invention—

1. The combination, substantially as hereinbefore set forth, of a coil of conducting-wire included in an electric circuit, a second coil connected in a branch between points of different potentials, one of which coils is movable with reference to the other, a pivoted arm or beam from which the movable coil is suspended, and a recording or registering device operated by the movements of said beam.

2. In an electric meter, the combination, substantially as hereinbefore set forth, of a revolving disk, a balanced beam, two wheels carried thereby and having their axes in planes perpendicular to the axis of said disk, means for causing one or the other of said wheels to touch said disk, a third wheel normally standing at the center of said disk, and means controlled by the first-named wheels for moving said third wheel from and toward the center of the disk.

3. The combination, substantially as hereinbefore set forth, with a dynamometer, of a scale-beam from one arm of which a movable portion of said dynamometer is suspended, a revolving disk, a perimeter-wheel moving with said scale-beam, means for causing said wheel to be placed against said disk by the variations in the current traversing said dynamometer, a second perimeter-wheel, and means for moving the same radially upon said disk by the revolution of the first-named wheel and a registering-train mechanically operated by said second wheel.

4. The combination, substantially as hereinbefore set forth, with a device responding to variations in an electric current, of a pivoted scale-beam actuated thereby, a weight moved upon said scale-beam in correspondence to the force exerted by said device, and an indicating device actuated with a variable speed dependent upon the position of said weight.

5. The combination, substantially as hereinbefore set forth, of an electric device responding to variations in current, a pivoted beam supporting a movable portion of said device from one end, a constantly-revolving disk, two perimeter-wheels supported at or near the respective ends of said beam, one or the other of which wheels may be brought into contact with said disk, a shaft rotated in one direction or the other accordingly as one or the other of said wheels is in contact with the disk, a perimeter-wheel resting at or near the center of said disk, means for moving said wheel radially by the operation of either of the first-named wheels, and means for raising either of said wheels out of contact with said disk when said perimeter-wheel has been moved a distance proportionate to the variations in the current measured.

6. The combination, substantially as hereinbefore set forth, with the coils A and B, the beam C, and the wheels $f'$ and $f^2$, of the disk G, the wheel M, resting upon said disk, the carriage for moving said wheel, the shaft E, for moving said carriage, the shaft $m$, carrying the wheel M, and the registering-train N, all organized substantially as described.

In testimony whereof I have hereunto subscribed my name this 10th day of August, A. D. 1885.

WILLIAM STANLEY, JR.

Witnesses;
DANL. W. EDGECOMB,
CHARLES A. TERRY.